United States Patent
Comi et al.

(10) Patent No.: US 8,671,756 B2
(45) Date of Patent: Mar. 18, 2014

(54) MEMS BIAXIAL RESONANT ACCELEROMETER

(75) Inventors: Claudia Comi, Milan (IT); Alberto Corigliano, Milan (IT); Barbara Simoni, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 280 days.

(21) Appl. No.: 13/303,038

(22) Filed: Nov. 22, 2011

(65) Prior Publication Data

US 2012/0132003 A1    May 31, 2012

(30) Foreign Application Priority Data

Nov. 26, 2010    (IT) ................ TO2010A0944

(51) Int. Cl.
*G01P 15/10*    (2006.01)
(52) U.S. Cl.
USPC ...................... 73/514.29; 73/514.38
(58) Field of Classification Search
USPC ......................... 73/514.29, 514.38
See application file for complete search history.

(56) References Cited

U.S. PATENT DOCUMENTS

| | | | |
|---|---|---|---|
| 4,851,080 A | 7/1989 | Howe et al. ................ 156/647 |
| 5,261,277 A | 11/1993 | Thomas et al. | |
| 5,567,879 A | 10/1996 | Fima et al. | |
| 5,574,220 A | 11/1996 | Amand et al. | |
| 5,948,982 A | 9/1999 | Woodruff et al. | |
| 5,969,249 A | 10/1999 | Roessig et al. | |
| 6,386,035 B2 | 5/2002 | Janiaud et al. | |
| 6,389,898 B1 | 5/2002 | Seidel et al. ............... 73/514.29 |
| 6,634,231 B2 | 10/2003 | Malametz | |
| 6,662,655 B2 | 12/2003 | Foote | |
| 6,662,658 B2 | 12/2003 | Foote | |
| 7,104,128 B2 | 9/2006 | Inglese et al. | |
| 8,136,401 B2 | 3/2012 | Hentz et al. | |
| 2001/0004846 A1 | 6/2001 | Kawai ........................ 73/504.02 |
| 2002/0152812 A1 | 10/2002 | Featonby et al. .......... 73/504.12 |
| 2003/0061877 A1 | 4/2003 | Stewart et al. .................. 73/510 |
| 2006/0096378 A1 | 5/2006 | Quer et al. ................. 73/514.29 |
| 2009/0095079 A1 | 4/2009 | Ayazi ......................... 73/514.29 |
| 2011/0056294 A1 | 3/2011 | Simoni et al. ............. 73/514.29 |

OTHER PUBLICATIONS

Aikele, M. et al., "Resonant accelerometer with self-test," Sensors and Actuators A 92:161-167, 2001.
Chen, W. et al., "Design and system-level simulation of a capacitive dual axis accelerometer," Proceedings of the $2^{nd}$ IEEE International Conference on Nano/Micro Engineered and Molecular Systems, Bangkok, Thailand, Jan. 16-19, 2007, pp. 614-617.

(Continued)

*Primary Examiner* — John Chapman, Jr.
(74) *Attorney, Agent, or Firm* — Seed IP Law Group PLLC

(57) ABSTRACT

A microelectromechanical detection structure for a MEMS resonant biaxial accelerometer is provided with: an inertial mass, anchored to a substrate by elastic elements to be suspended above the substrate. The elastic elements enabling inertial movements of the inertial mass along a first axis of detection and a second axis of detection that belong to a plane of main extension of said inertial mass, in response to respective linear external accelerations. At least one first resonant element and one second resonant element have a respective longitudinal extension, respectively along the first axis of detection and the second axis of detection, and are mechanically coupled to the inertial mass through a respective one of the elastic elements to undergo a respective axial stress when the inertial mass moves respectively along the first axis of detection and the second axis of detection.

19 Claims, 7 Drawing Sheets

(56) References Cited

OTHER PUBLICATIONS

Comi, C. "On geometrical effects in micro-resonators," Latin American Journal of Solids and Structures 6:73-87, 2009.

Comi, C. et al., "A surface micromachined resonant accelerometer with high resolution," 7th EUROMECH Solid Mechanics Conference, Lisbon, Portugal, Sep. 7-11, 2009, 8 pages.

Comi, C. et al., "A high sensitivity uniaxial resonant accelerometer," 2010 IEEE 23rd International Conference on Electro Mechanical Systems (MEMS), Wanchai, Hong Kong, Jan. 24-28, 2010, pp. 260-263.

He, L. et al., "Folded silicon resonant accelerometer with temperature compensation," Sensors 2004, Proceedings of the IEEE 1:512-515, Oct. 2004.

Kacem, N. et al., "From MEMS to NEMS: Modelling and characterization of the non linear dynamics of resonators, a way to enhance the dynamic range," 8th World Congress on Computational Mechanics (WCCM8), 5th European Congress on Computational Methods in Applied Sciences and Engineering (ECCOMAS 2008), Venice, Italy, Jun. 30-Jul. 5, 2008, 2 pages.

Seshia A.A. et al., "A vacuum packaged surface micromachined resonant accelerometer," Journal of Microelectromechanical Systems 11(6):784-793, Dec. 2002.

Su, S.X.P. et al., A resonant accelerometer with two-stage microleverage mechanisms fabricated by SOI-MEMS technology, IEEE Sensors Journal, 5(6):1214-1223, Dec. 2005.

MEMS BIAXIAL RESONANT ACCELEROMETER

BACKGROUND

1. Technical Field

The present disclosure relates to a resonant biaxial accelerometer structure of a MEMS (microelectromechanical system) type, in particular capable of detecting with high electrical performance two independent components of acceleration in a plane.

2. Description of the Related Art

As is known, MEMS accelerometers are currently used, thanks to their extremely compact dimensions, low levels of consumption, and good electrical performance, in a wide range of fields of application, amongst which include the automotive industry, monitoring of vibrations, and portable electronics.

The numerous MEMS accelerometers proposed in the literature and currently present on the market can be generally grouped into three classes, on the basis of the principle of detection used by the corresponding microelectromechanical detection structure: capacitive, resonant, and piezoresistive.

In resonant accelerometers, the external acceleration to be measured produces a detectable shift of the resonance frequency of the microelectromechanical structure, or of some part thereof. The resonant detection, as compared to other measurement principles, presents the advantage of offering a direct frequency output, high sensitivity, and wide dynamic range.

In greater detail, the external acceleration is detected in terms of a shift in the resonance frequency of a resonant element, in general beam-shaped, coupled to an inertial mass (the so-called "proof mass" or "free mass").

An external linear acceleration a produces a force F on the inertial mass m, with F=m·a; said force in turn produces an axial action N, proportional thereto (and hence proportional to said external acceleration a) in the resonant element, which is appropriately kept in a resonance condition by an electronic circuit coupled thereto. The axial action hence determines a variation of the natural resonance frequency, designated by f, of the resonant element, according to the following relation:

$$f = f_0 \cdot \sqrt{1 + \alpha \frac{NL^2}{EI}} \quad (1)$$

where $f_0$ is the fundamental frequency of the resonant element without axial load, given by:

$$f_0 = \frac{c^2}{2\pi L^2} \cdot \sqrt{\frac{EI}{\rho A}} \quad (2)$$

and moreover L, A and I are, respectively, the length, the area of the cross section, and the moment of inertia of the resonant element, ρ is the mass density of the material of which it is made, E is the elastic modulus, and c and α are coefficients, the value of which depends, in a known way, upon the conditions of constraint of the beam that constitutes said resonant element.

If the external acceleration is angular, instead of linear, a torque is generated, proportional to the polar moment J of the mass, which induces, in a way similar to what has been discussed previously, an axial action on the resonant element, varying the frequency thereof according to the aforesaid relation (1).

Various accelerometers based upon the resonant operating principle have been proposed and fabricated by the semiconductor technologies, and in particular by means of techniques of "bulk micromachining" or, more recently, of "surface micromachining". With reference to resonant accelerometers obtained with surface-micromachining techniques, the following documents may for example be cited:

M. Aikele, K. Bauer, W. Ficker, F. Neubauer, U. Prechtel, J. Schalk, H. Seidel "Resonant accelerometer with self-test", Sensors and Actuators A, 92, 161-167, 2001;

A. A. Seshia, M. Palaniapan, T. A. Roessig, R. T. Howe, R. W. Gooch, T. R. Shimert, S. Montague "A vacuum packaged surface micromachined resonant accelerometer", JMEMS, 11, 784-793, 2002;

L. He, Y.-P. Xu, A. Qiu "Folded silicon resonant accelerometer with temperature compensation", Sensors 2004. Proceedings of IEEE, 1, 512-515, 24-27 Oct. 2004;

S. X. P. Su, H. S. Yang, A. M. Agogino "A resonant accelerometer with two-stage microleverage mechanisms fabricated by SOI-MEMS technology" Sensors, 5(6), 1214-1223, 2005.

The various MEMS resonant accelerometers so far proposed differ from the standpoint of the geometries envisaged for the microelectromechanical detection structure (in particular for the different arrangements of the resonant element with respect to the inertial mass), and consequently for the electrical characteristics that derive therefrom, for example as regards the amplification of the axial force and consequently the sensitivity in the detection of acceleration. In particular, the sensitivity of resonant accelerometers is generally defined as the variation in frequency generated by an external acceleration the equal to 1 g.

Known resonant accelerometers obtained through techniques of surface micromachining typically have a sensitivity that starts from some tens of Hz/g and does not exceed 200 Hz/g, and, at least some of them, have rather large dimensions.

In addition, the MEMS resonant accelerometers proposed so far are for the most part of a uniaxial type, i.e., able to detect, with a single inertial detection mass, a single component of acceleration directed along a given axis of detection. Consequently, it is necessary to replicate the microelectromechanical structures proposed, each provided with a corresponding inertial mass, to obtain a detection of components of acceleration directed along a number of axes of detection.

The present applicant has recently proposed in U.S. patent publication application 2011/0056294, a microelectromechanical structure for a resonant accelerometer, of a uniaxial type, which has a high sensitivity and reduced dimensions, thanks to the particular geometrical arrangement of the constitutive elements. Also the teachings of said patent application do not regard, however, a structure with a number of axes of detection that is compact and has high electrical performance.

BRIEF SUMMARY

The present disclosure is directed to providing a microelectromechanical structure for a resonant accelerometer that will present improved physical and electrical characteristics, and in particular that will enable a biaxial detection of components of accelerations acting along at least two axes of detection in a plane. One embodiment of the present disclosure includes a microelectromechanical detection structure for a MEMS resonant biaxial accelerometer. The detection structure including a substrate; a plurality of elastic elements; and an inertial mass, anchored to the substrate by the elastic elements to be suspended above said substrate, said elastic elements configured to enable inertial movements of detection of said inertial mass along a first detection axis and a second detection axis belonging to a plane of main extension of said inertial mass, responsive to respective linear external accelerations. The detection structure also includes a first resonant element having a respective longitudinal extension along said first detection axis and mechanically coupled to said inertial mass through a respective one of said elastic elements, to undergo a first axial stress when said inertial mass moves along said first detection axis and a second resonant element, having a respective longitudinal extension along said second detection axis and mechanically coupled to said inertial mass through a respective one of said elastic elements, to undergo a second axial stress when said inertial mass moves along said second detection axis.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

One aspect of the present disclosure envisages the use of a single inertial mass for the detection of at least two independent components of acceleration in a plane, in particular coinciding with a plane of main extension of said inertial mass. Appropriately coupled to said single inertial mass are resonant elements for detecting the aforesaid components of acceleration according to the principle of the variation of the resonance frequency (see in this regard the foregoing description).

Figure 1:
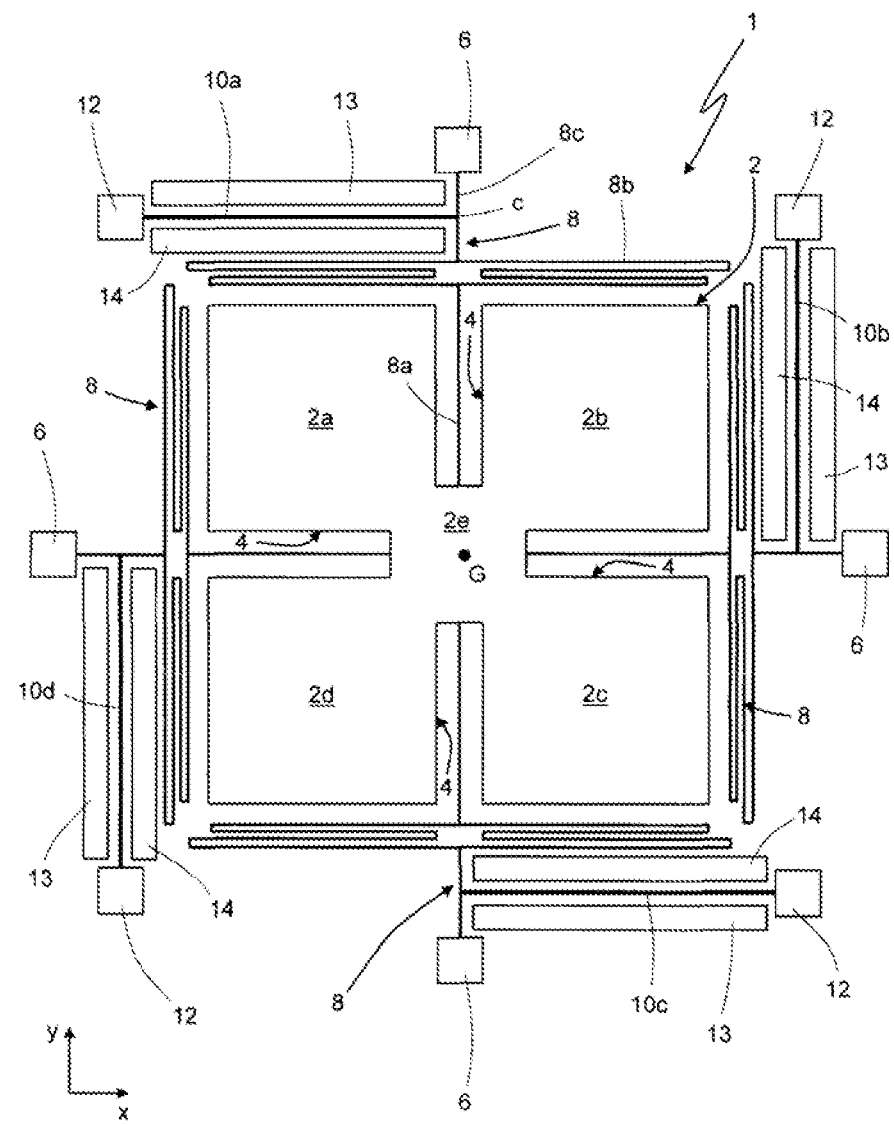
FIG. 1 shows a schematic top plan view of a microelectromechanical detection structure of a resonant accelerometer, according to a first embodiment of the present disclosure.

In detail, FIG. 1 shows a first embodiment of a microelectromechanical detection structure, designated as a whole by 1, of a resonant biaxial accelerometer. The microelectromechanical detection structure 1 is produced in an integrated way, with the surface-micromachining semiconductor techniques, in particular starting from a body made of semiconductor material (such as silicon).

The microelectromechanical detection structure 1 comprises a single inertial mass 2, which has, for example, a generically square shape in a plane xy, corresponding to a principal plane of extension of its own, defined by a first axis x and by a second axis y, which correspond moreover to the directions of detection of the resonant biaxial accelerometer (as will be clarified hereinafter). The inertial mass 2 has a negligible dimension in the direction orthogonal to said plane xy, along a third axis z, which defines, with the aforesaid first and second axes x, y, a set of three orthogonal axes.

In particular, the inertial mass 2 has, in said first embodiment, four portions of mass 2a-2d, which have, for example, a substantially square shape in the plane xy and define an external boundary of the mass in said plane xy, and a central portion 2e, which radiuses the portions of mass 2a-2d at the center and has also, for example, a substantially square shape in plan view. The inertial mass 2 moreover has a centroidal axis (defined as the axis passing through its center of gravity G, in this case coinciding with the geometrical center of the central portion 2e), which moreover represents an axis of symmetry for the microelectromechanical detection structure 1 and is directed orthogonal to the plane xy.

The portions of mass 2a-2d define, in adjacent pairs, respective openings 4, numbering four in all, which extend starting from the central portion 2e and open towards the outside of the inertial mass 2. In particular, openings 4 of a first pair extend from opposite sides of the central portion 2e along the second axis y, whereas the remaining openings 4 extend along the first axis x, and are also set on opposite sides of the central portion 2e. In general, the structure of the inertial mass 2 is symmetrical with respect to axes parallel to the axes x and y and passing through the geometrical center of the central portion 2e (center of gravity G).

The inertial mass 2 is anchored to a substrate (not illustrated, for example a substrate made of semiconductor material, such as silicon) so as to be suspended above said substrate, with the plane xy substantially parallel to a top surface of said substrate.

In particular, the inertial mass 2 is elastically coupled to first anchorages 6, numbering four in all in the first embodiment illustrated, set externally to said inertial mass 2, and aligned in pairs to the openings 4 in the direction of the prolongation of said openings 4, along the first axis x or the second axis y. The first anchorages 6 are for example constituted by pillars that extend as far as, and are mechanically connected to, the substrate.

In particular, the inertial mass 2 is connected to the aforesaid first anchorages 6 by means of respective elastic elements 8 (which are also four in number in the embodiment illustrated), as a whole configured so as to maintain the inertial mass 2 suspended above the substrate and enable at least one first linear movement of translation and one second linear movement of translation thereof (with respect to said substrate), respectively along the first axis x and the second axis y, and as to prevent movements thereof out of said plane xy.

Each elastic element 8 comprises: a first portion 8a, constituted by a rectilinear linear spring (the so-called "single beam"), which extends along the first axis x or second axis y starting from an external lateral surface of the central portion 2e of the inertial mass 2 (centrally with respect thereto), within a respective openings 4; a second portion 8b, connected to the first portion 8a, and constituted by a folded spring (the so-called "folded beam"), having extension in a direction transverse to the first portion 8a, in particular along the second axis y or first axis x (the second portion 8b is hence constituted by a plurality of rectilinear springs, parallel to one another, which have main extension in the aforesaid transverse direction and are radiused to one another at the corresponding ends); and a third portion 8c, connected to the second portion 8b and constituted once again by a rectilinear spring, having extension along the first axis x or second axis y, as prolongation of the first portion 8a, with length much smaller than the corresponding length of said first portion 8a, until it reaches a respective first anchorage 6, joining to an external lateral surface thereof facing the corresponding lateral surface of the central portion 2e.

In particular, the elastic elements 8 are very thin (the corresponding constituent portions have, that is, a length in the direction of extension much greater than the corresponding width).

The microelectromechanical detection structure 1 further comprises a resonant part, formed by four resonant elements 10a-10d, each of which is constituted by a thin resonant beam.

In the embodiment illustrated, the resonant elements 10a-10d are set externally to the inertial mass 2, with respect to the plane xy, and extend parallel in pairs along the first axis x or the second axis y, moreover parallel to the second portion 8b of an associated elastic element 8, externally thereto.

In particular, each resonant element 10a-10d is rigidly constrained to the substrate at a first end thereof, by means of a respective second anchorage 12 (once again constituted, for example, by a pillar that extends as far as, and is connected to, the substrate), and extends starting from said second anchorage 12 until it joins, with a second end of its own, a respective elastic element 8, in particular the third portion 8c of said elastic element 8, in close proximity of the respective first anchorage 6 of said elastic element 8. The point of connection of the resonant element 10a-10d to the respective elastic element 8 is designated by c. Each resonant element 10a-10d hence forms with the part of the third portion 8c of the respective elastic element 8, comprised between the point of connection c and the corresponding first anchorage 6, an L-shaped resonant structure.

Each resonant element 10a-10d is hence mechanically coupled to the inertial mass 2 through a respective elastic element 8. Advantageously, said configuration enables high values of detection sensitivity to be obtained with an inertial mass 2 of contained dimensions in so far as the intermediate presence of the elastic elements 8 prevents the stiffness of the resonant elements 10a-10d from hindering directly the inertial mass 2 and hence reducing the excursion of the movements thereof upon detection of the external accelerations.

It has moreover been verified that the position of the point of connection c in the close proximity of the first anchorages 6 is a factor that determines the electrical characteristics of the resonant detection structure (in terms of amplification of the axial force in response to an external acceleration, and hence of the detection sensitivity). In particular, it has been verified, by means of simulations and experimental tests, that it is advantageous, in order to improve the detection sensitivity (defined as the variation of frequency produced by an acceleration of 1 g, g being the acceleration of gravity), to position the point of connection c very close to the position of the first anchorages 6 of the elastic elements 8. For example, if we designate by L the length of said elastic elements 8, considered as a whole, along the first axis x or second axis y (from the central portion 2e of the inertial mass 2 up to the respective first anchorage 6), it is advantageous to position the point of connection c at a distance from the corresponding first anchorage 6 comprised between 0.01·L and 0.02·L, for example, at approximately one sixtieth of the length L starting from the corresponding first anchorage 6.

The configuration described of the resonant elements 10a-10d moreover advantageously enables increase in the interval of linear behavior in frequency of the microelectromechanical detection structure 1. In particular, it may be shown that the presence of the part of the third portion 8c of the elastic elements 8, comprised between the point of connection c and the corresponding first anchorage 6, of small dimensions, causes the linear behavior of each resonant element 10a-10d not to depart substantially from that of standard resonators constrained at both ends (the so-called "double-clamped" resonators), while the non-linear behavior is instead considerably improved. For example, the so-called "hard spring" effect exhibited by double-clamped resonators, in the presence of oscillations of amplitude comparable with the width of said resonators, is considerably attenuated in the proposed structure, thanks to the change in the boundary conditions defined by coupling of one of the ends of the resonant elements 10a-10d to the respective elastic element 8.

The microelectromechanical detection structure 1 further comprises, for each resonant element 10a-10d, a pair of electrodes 13, 14, arranged parallel to one another and parallel to the corresponding resonant element 10a-10d, on opposite sides of said resonant element 10a-10d with respect to the first axis x or second axis y. A first electrode 13 is used to send the associated resonant element 10a-10d into a resonance condition by applying an appropriate difference of electrical potential, whilst a second electrode 14 is used as detection electrode, for detecting, by means of a variation of the capacitive coupling with the resonant element 10a-10d, variations of the corresponding resonance frequency (according to a detection scheme known as "parallel plate"). As shown in FIG. 1, the electrodes 13 and 14 have an encumbrance along the corresponding direction of extension that is advantageously contained between a second anchorage 12 and the third portion 8c of the facing elastic element 8. In a way not illustrated, appropriate electrical-connection paths are envisaged for the electrical connection of the aforesaid electrodes 13, 14 to an electronic circuit coupled to the microelectromechanical detection structure 1. Said electronic circuit is configured so as to supply the electrical signals of actuation to the microelectromechanical detection structure 1, and receive and process the electrical detection signals supplied by said microelectromechanical detection structure 1.

In a way not illustrated herein, there may be moreover provided appropriate stopper elements for limiting the excursion of the movement of the inertial mass 2 in the plane xy. Said stoppers are conveniently anchored to the substrate and are able to stop the movement of the inertial mass 2. In any case, it has been shown that the stresses to which the elastic elements 8 are subjected, in particular at the corresponding first anchorages 6, can amply fall within the limits of resistance of the material of which they are made (for example polysilicon).

Figure 2A:
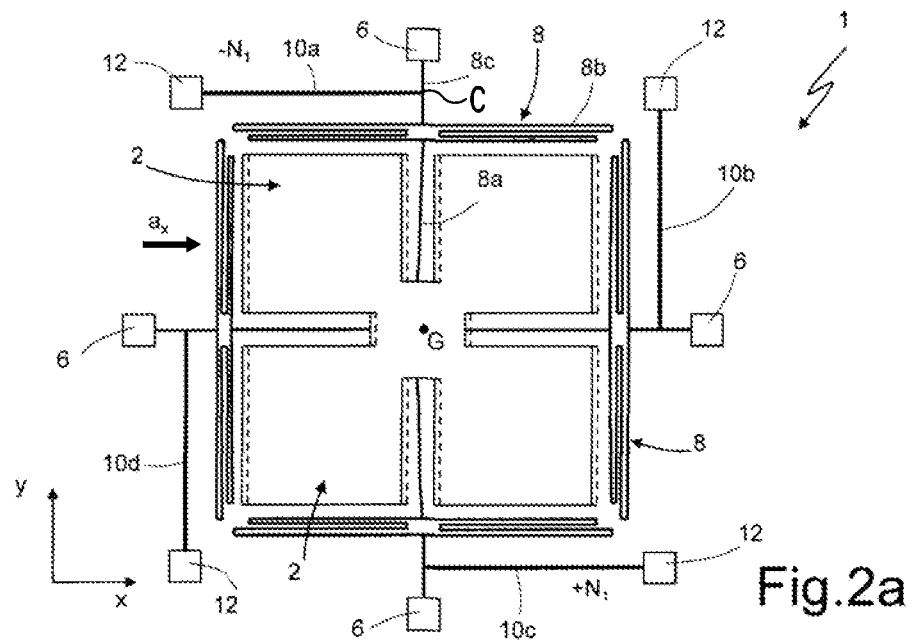
FIGS. 2a, 2b and 2c show deformations of the microelectromechanical detection structure of FIG. 1, in the presence of different external-accelerations.
Figure 2B:
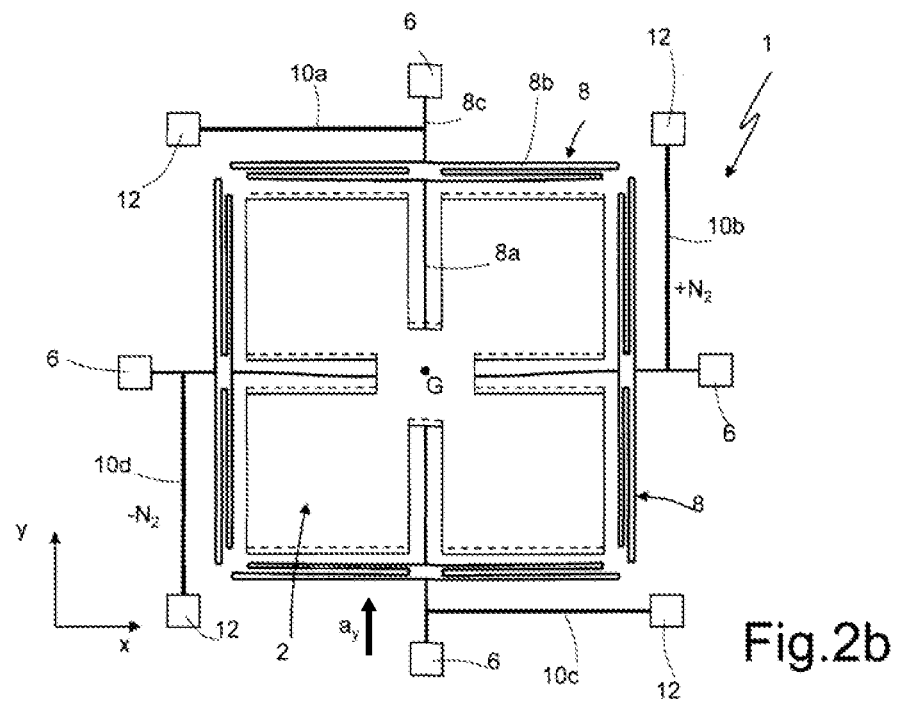
Figure 2C:
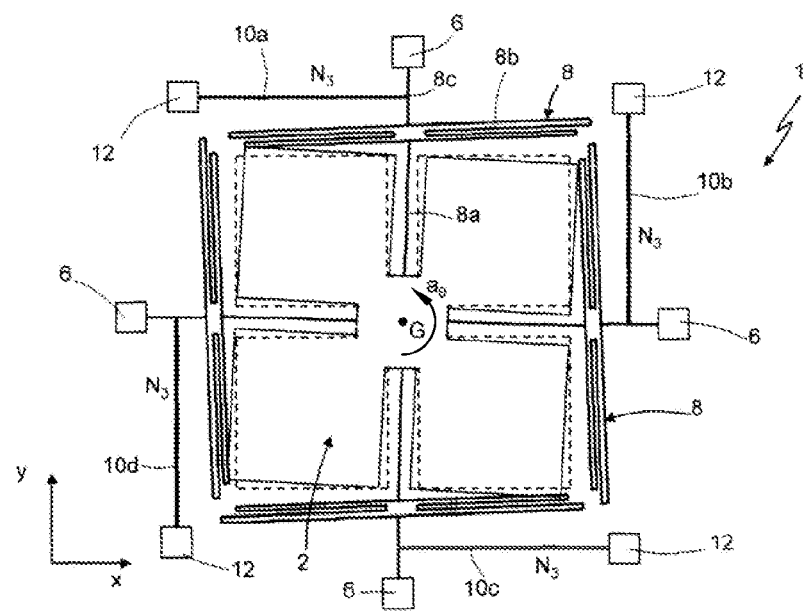

The principle of operation of the microelectromechanical detection structure 1 will now be described with reference also to FIGS. 2a-2c, which illustrate possible deformations thereof in response to different external-accelerations, and in particular in response to: a first, linear, acceleration $a_x$ acting along the first axis x (FIG. 2a); a second, linear, acceleration $a_y$ acting along the second axis y (FIG. 2b); and a third, angular, acceleration $a_\theta$ acting about the centroidal axis, or, in an equivalent way, about the third axis z (FIG. 2c). As will be highlighted in detail, the arrangement of the elastic elements 8 enables in fact three movements of the inertial mass 2 in the plane xy (a first translation and a second translation, respectively along the first axis x and the second axis y, and moreover a rotation about the third axis z); the effects of said movements on the resonant elements 10a-10d can be decoupled in such a way as to enable detection of the corresponding components of acceleration individually and without mutual interference.

In the absence of external acceleration, the four resonant elements 10a-10d have the same nominal frequency of resonance $f_0$, as a result of the interaction with the corresponding first electrodes 13 and the associated electronic circuit.

When the inertial mass 2 is subjected to a first acceleration $a_x$ along the first axis x (in the direction of the arrow in FIG. 2a), the inertial mass 2 translates as a whole along said first axis x, as a result of the bending of the second (folded) portion 8b of a first pair of the elastic elements 8, and moreover of the bending of the first (linear) portion 8a of the remaining elastic elements 8 (in general, there occurs the bending of the springs with extension transverse to the direction of displacement, in this case with extension along the second axis y, whilst the springs with extension along the first axis x do not undergo an appreciable deformation). It should be noted that in FIG. 2a (as in the subsequent FIGS. 2b and 2c) the starting position of the inertial mass 2 is indicated with a dashed line, whilst the position resulting from the displacement due to the external acceleration is indicated with a solid line.

The movement of translation of the inertial mass 2 along the first axis x consequently causes, evidently, a compressive stress $-N_1$ on a first resonant element 10a of the pair of resonant elements arranged along the first axis x, and a tensile stress $+N_1$, having the same intensity, on the second resonant element 10c of said pair; in particular, the movement of the inertial mass 2 is transmitted to the resonant elements 10a, 10c by the respective elastic elements 8, at the point of connection c, the position of which is substantially constrained.

Consequently, the resonance frequency of the first resonant element 10a, designated by $f_1$, undergoes a decrease in its value, whilst the resonance frequency of the second resonant element 10c of the pair, designated by $f_2$, undergoes a corresponding increase in its value. With an appropriate combination of the electrical signals at output from the two resonant elements 10a, 10c, and using Eq. (1) above, linearized around the fundamental frequency $f_0$, it is possible to obtain the following expression for the difference between the frequency $f_2$ of the second resonant element 10c and the frequency $f_1$ of the first resonant element 10a:

$$f_2 - f_1 \cong f_0\left(1 + \alpha\frac{N_1 L^2}{2EI} - 1 + \alpha\frac{N_1 L^2}{2EI}\right) = f_0 \alpha \frac{N_1 L^2}{EI} \quad (3)$$

Said difference is hence directly proportional to the compressive/tensile stress $N_1$ acting on the resonant elements 10a, 10c, and hence to the value of the first acceleration $a_x$ acting along the first axis x (which can hence be conveniently measured).

It is emphasized that the presence of the two resonant elements, in this case the resonant elements 10a, 10c, which are subjected to opposite axial forces, provides various advantages, amongst which:
- the sensitivity in detection of the external accelerations is twice as much when the difference between the frequency of the two resonant elements is measured instead of the variation of frequency of a single resonant element;
- the linearity of the system is improved, i.e., the response of the accelerometer can be linearized in a wider range of accelerations; and
- the geometry described is less sensitive to the spurious effects of the thermal load, given that, when the difference between the frequencies is considered, a non-elastic effect that causes a pre-stress in the resonant elements vanished.

Advantageously, the resonant elements 10b, 10d of the other pair of resonant elements arranged along the second axis y are, instead, substantially not loaded and not subject to axial stresses with respect to the resting condition, in the presence of said first external acceleration $a_x$.

In an altogether similar way, and as illustrated in FIG. 2b, a second acceleration $a_y$ acting along the second axis y (in the direction indicated by the arrow in FIG. 2b) determines an overall displacement of the inertial mass 2 along the second axis y.

The movement of translation of the inertial mass 2 along the second axis y causes in this case a compressive stress $-N_2$ (with $N_2$ that can be equal to $N_1$, in the case of a perfectly symmetrical structure and $a_x$ is equal to $a_y$) on a first resonant element 10d of the pair of resonant elements arranged along the second axis y, and a tensile stress $+N_2$, of the same intensity, on the second resonant element 10b of the pair. In a way altogether similar to what has been discussed previously, the difference between the resonance frequencies $(f_4-f_3)$ of said resonant elements 10d, 10b is hence proportional to the value of the second external acceleration $a_y$ acting along the second axis y, which can conveniently be measured by the electronic circuit coupled to the microelectromechanical detection structure 1.

Also in this case, the resonant elements 10a, 10c of the other pair of resonant elements arranged along the first axis x are, instead, substantially not loaded and not subject to stresses with respect to the resting condition, in the presence of the second external acceleration $a_y$.

The microelectromechanical detection structure 1 is moreover sensitive to a third, angular, external acceleration $a_\theta$ acting about the third axis z, as illustrated in FIG. 2c.

In this case, the inertial mass 2 is set in rotation about its centroidal axis, causing axial stresses of the same value and sign, $N_\theta$, in all four resonant elements 10a-10d. In this case, by appropriately adding the values of resonance frequency $f_1$-$f_4$ of the resonant elements 10a-10d, a measurement of the stress acting on said resonant elements 10a-10d, and hence of the third external acceleration $a_\theta$, is obtained as follows:

$$f_1 + f_2 + f_3 + f_4 - 4f_0 \cong 4 \cdot f_0\left(1 + \alpha\frac{N_\theta L^2}{2EI} - 1\right) = 2f_0 \alpha \frac{N_\theta L^2}{EI} \quad (4)$$

It is hence evident that the microelectromechanical detection structure 1 is configured in such a way as to decouple the effects of the external accelerations on the resonant elements 10a-10d, and in particular in such a way that it is possible, by means of appropriate combinations of the electrical quantities supplied by the various resonant elements 10a-10d, to determine independently the value of said external accelerations.

Figure 3:
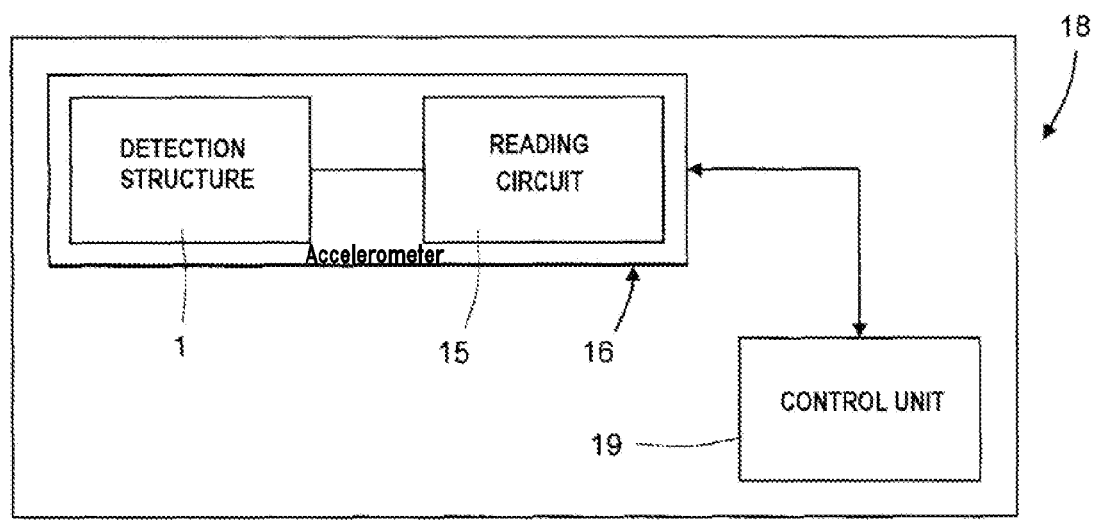
FIG. 3 is a simplified block diagram of a resonant accelerometer incorporating the microelectromechanical detection structure, and an electronic apparatus provided with said resonant accelerometer.

For this purpose, as shown in FIG. 3, the microelectromechanical detection structure 1 is conveniently coupled to an appropriate electronic reading circuit 15, configured in such a way as to carry out the aforesaid processing operations and combinations of the values of frequency $f_1$-$f_4$ in order to determine the values of the linear external accelerations, $a_x$ and $a_y$, and angular acceleration $a_\theta$. Conveniently, the electronic reading circuit 15 comprises three measurement channels decoupled from one another, for the measurement one of the first linear acceleration $a_x$, one of the second external linear acceleration $a_y$, and one of the external angular acceleration $a_\theta$). The microelectromechanical detection structure 1 and the associated electronic reading circuit 15 form together a resonant biaxial accelerometer 16 (moreover able to detect an angular acceleration, as illustrated previously). The electronic reading circuit 15 is conveniently provided in an integrated form as ASIC (application-specific integrated circuit), in a die, which can be advantageously housed in the same package that houses also the die in which the microelectromechanical detection structure 1 is provided.

As shown schematically in said FIG. 3, an electronic apparatus 18, provided with said resonant biaxial accelerometer 16, for example a portable apparatus, such as a laptop, a palm-top, or a photographic camera or a video-camera, further comprises a control unit 19 (for example, a microprocessor control unit), electrically connected to the electronic reading circuit 15 so as to receive the measurements of acceleration for carrying out operations of control for management of said electronic apparatus 18.

Figure 4:
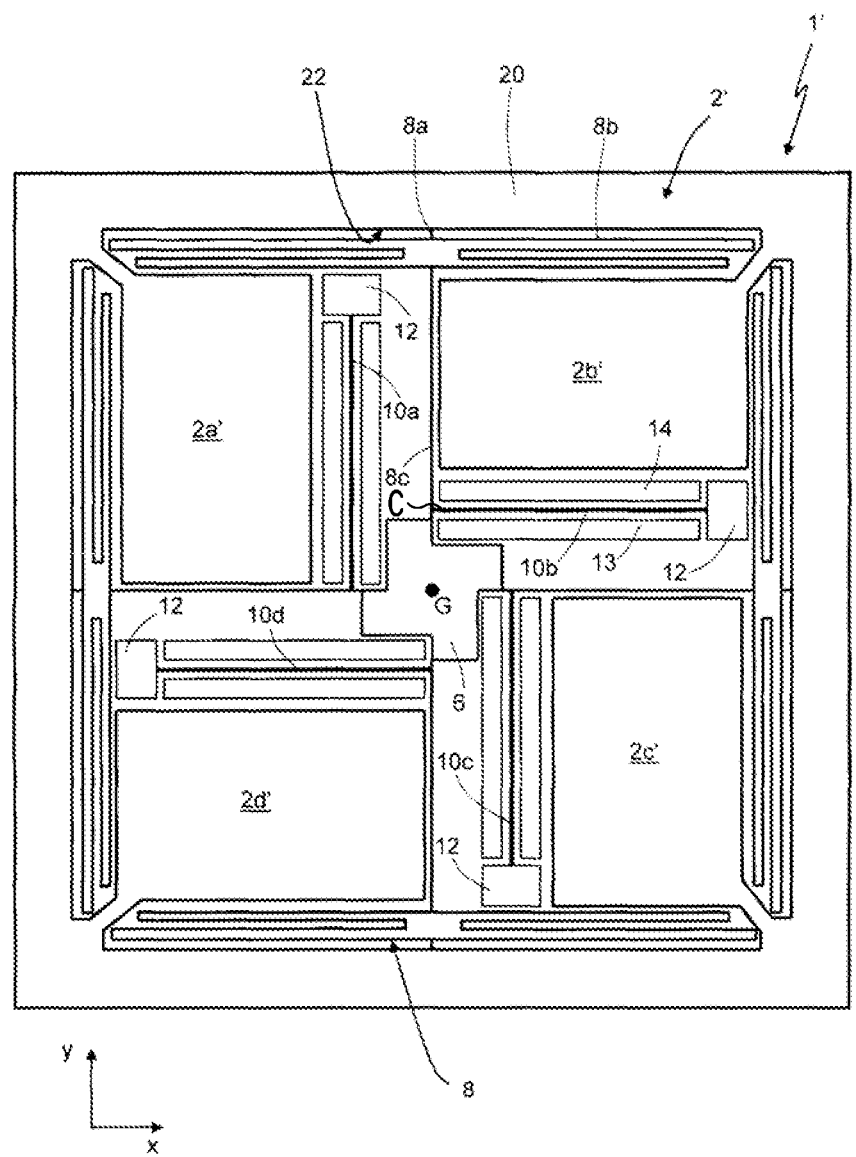
FIG. 4 shows a schematic top plan view of a microelectromechanical detection structure, in accordance with a second embodiment of the present disclosure.

There now follows a description, with reference to FIG. 4, of a second embodiment of the microelectromechanical detection structure, designated herein by 1', which differs from the one illustrated previously by a different configuration of its constitutive elements. Operation of the microelectromechanical detection structure 1' does not differ, instead, from what has been illustrated previously, and, for said reason, will not be described again in what follows.

In particular, said second embodiment is distinguished by the fact that the resonant elements 10a-10d are set internally with respect to the encumbrance of the inertial mass, designated here by 2', in the plane xy.

In detail, the inertial mass 2' comprises in this case a frame 20, for example having a substantially square perimeter in the plane xy, and defining inside an internal opening 22. The inertial mass 2' also comprises in this case four portions of mass, designated here by 2a'-2d', which are arranged inside the frame 20 in the internal opening 22 and are connected to respective internal corners of said frame 20. The portions of mass 2a'-2d' have, for example, a substantially rectangular shape in the plane xy and are arranged parallel in pairs and symmetrically with respect to the center of gravity G.

The inertial mass 2' is here fixed to the substrate (once again not illustrated) by means of a single first anchorage 6, set centrally in the internal opening 22, and traversed centrally by the centroidal axis (in a position corresponding to the center of gravity G).

The elastic elements 8, which are four in number, hence also extend in the internal opening 22, within the frame 20, starting from respective external lateral surfaces of the first anchorage 6 as far as a facing lateral internal surface of said frame 20. The second portion 8b of each elastic element 8 is in particular set between the internal lateral surface of said frame 20 and a lateral surface of respective portions of mass 2a'-2d' of the inertial mass 2', facing it. In this case, the first portion 8a of each elastic element 8 has a length much smaller than that of the third portion 8c, given the central position of the single first anchorage 6 and the arrangement of the second portion 8b of said elastic elements 8.

In addition, the resonant elements 10a-10d are arranged in the internal opening 22, inside the frame 20, facing the respective electrodes 13, 14, which are also arranged in said internal opening 22. In particular, the resonant elements 10a-10d, and the associated electrodes 13, 14, are set internally with respect to the portions of mass 2a'-2d' with respect to the frame 20, in the proximity of central axes of symmetry of the inertial mass 2' (parallel to the first axis x and to the second axis y).

Once again, the resonant elements 10a-10d extend from a respective second anchorage 12 (the second anchorages 12 being four in number and being arranged in the internal opening 22), until they connect up to a respective elastic element 8, in particular to the third portion 8c of said elastic element 8.

The point of connection c in which each resonant element 10a-10d is connected to the respective elastic element 8 is in this case in close proximity of the single first anchorage 6, set centrally with respect to the structure.

Said second embodiment has the advantage of presenting a compact structure, all enclosed inside the frame 20 of the inertial mass 2'. In addition, the presence of a single first anchorage 6 for said inertial mass 2', set in a position corresponding to the center of gravity G of the structure, is advantageous for the reduction of the thermomechanical stresses possibly acting on the structure (for example, due to deformations of the package of the resonant biaxial accelerometer 16). Once again in order to reduce the thermomechanical stress, it is advantageous to arrange the second anchorages 12 of the resonant elements 10a-10d inside the inertial mass 2', which are also close to the center of gravity G of the structure.

Figure 5:
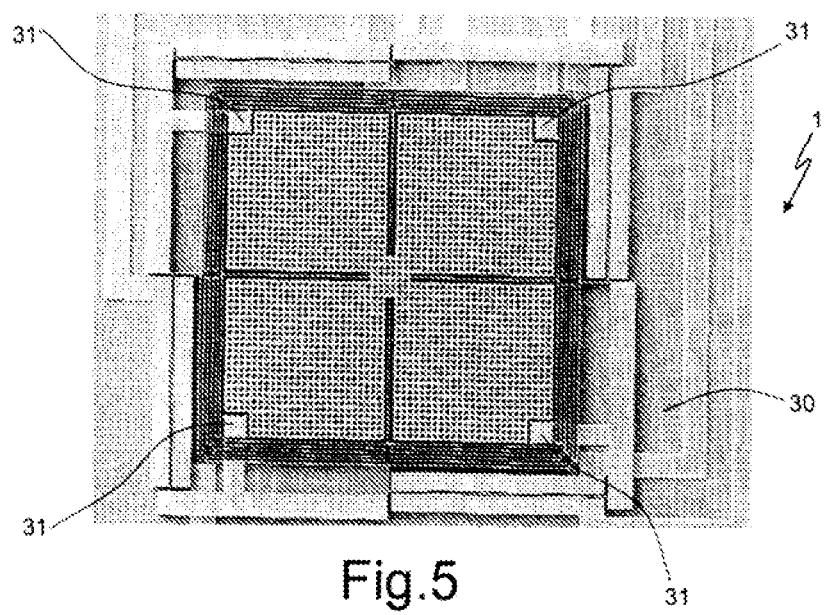
FIGS. 5 and 6 are SEM (scanning electron microscopy) images of the microelectromechanical detection structure, respectively, of FIGS. 1 and 4.
Figure 6:
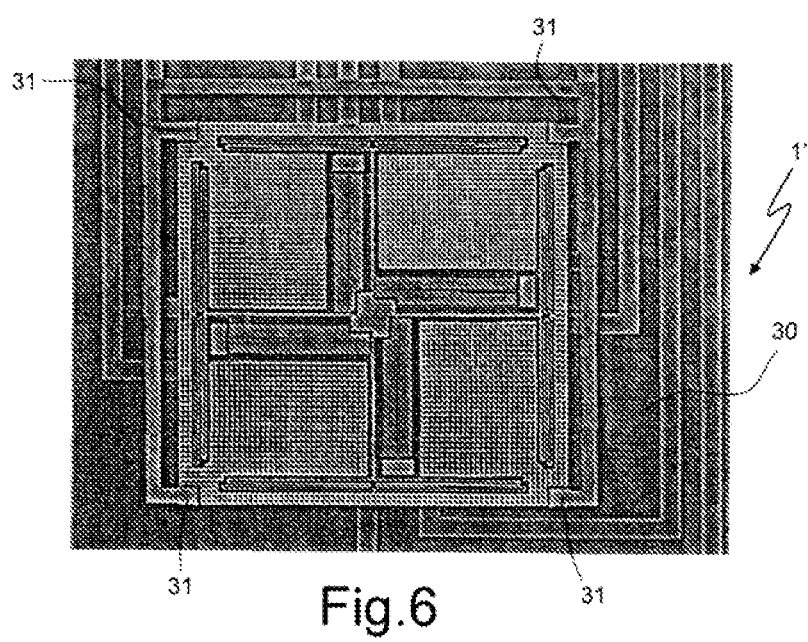

FIGS. 5 and 6 are top plan views of the microelectromechanical detection structures 1, 1' described previously, respectively according to the first embodiment and the second embodiment, obtained by means of SEM. There may be noted the presence of holes made throughout the thickness of the inertial mass 2, 2', in order to enable release thereof with respect to the substrate by chemical etching of underlying regions of material, and moreover the presence of appropriate paths for electrical connection to the elements of the structure. In addition, in said images, designated by 30 is the substrate of the microelectromechanical detection structures 1, 1', made for example of silicon, and designated by 31 are the stopper elements arranged at the corners of the inertial mass 2, 2'.

The microelectromechanical detection structure 1, 1' can be obtaining with surface-micromachining processes, for example using the so-called ThELMA (thick epipoly layer for microactuators and accelerometers) process.

The ThELMA process enables fabrication of suspended structures of relatively large thicknesses (for example of the order of 10-15 μm), anchored to the substrate through compliant parts (springs) and consequently capable of displacing at least in a plane parallel to the underlying silicon substrate (the plane xy referred to above). The process consists of different production steps:
  thermal oxidation of the substrate;
  deposition and patterning of horizontal electrical interconnections;
  deposition and patterning of a sacrificial layer;
  epitaxial growth of a structural layer (for example, made of polysilicon and with a thickness of 15 μm);
  patterning of the structural layer by means of trench etching; and
  removal of the sacrificial oxide and deposition of contact metallizations.

From what has been described and illustrated previously, the advantages that the present disclosure affords are evident.

In particular, the microelectromechanical detection structure 1, 1', combined with an appropriate electronic reading circuit 15, provides biaxial resonant accelerometers 16 of a very small size, smaller in particular than that of capacitive accelerometers obtained with the same technology. The reduction in size is obtained by using a single inertial mass 2, 2' for detection of two components of acceleration in the plane xy, and possibly, albeit with lower sensitivity, of a further angular acceleration, and moreover by means of an appropriate arrangement of the resonant elements 10a-10d with respect to said inertial mass 2, 2'.

Given the same overall dimensions, it is possible to obtain high values of sensitivity as compared to traditional structures. In the first embodiment, the structure proposed enables, for example, with dimensions of approximately 550 μm×550 μm, a sensitivity higher than 200 Hz/g to be obtained. The sensitivity for the angular acceleration is, instead, lower than the sensitivity for the linear accelerations in the plane xy, for example, in the region of 0.05 Hz/(rad/s$^2$).

The structure proposed enables reduction of the effects of the spurious axial forces on the resonant beams, and moreover the differential measurement of frequency increases the range of linearity of the accelerometer. In particular, the presence of two resonant elements subjected to axial action of opposite sign for a given external linear acceleration enables measurement of acceleration even in the presence of a state of internal stress generated, for example, by a thermal variation.

Finally, it is clear that modifications and variations may be made to what has been described and illustrated so far, without thereby departing from the scope of the present disclosure as defined in the annexed claims.

In particular, it is evident that the geometrical shape of the microelectromechanical detection structure 1, 1', or of parts thereof, could differ from the one described previously. In addition, the microelectromechanical detection structure 1, 1' could comprise a single resonant element 10a-10d for each axis of detection x, y.

Figure 7A:
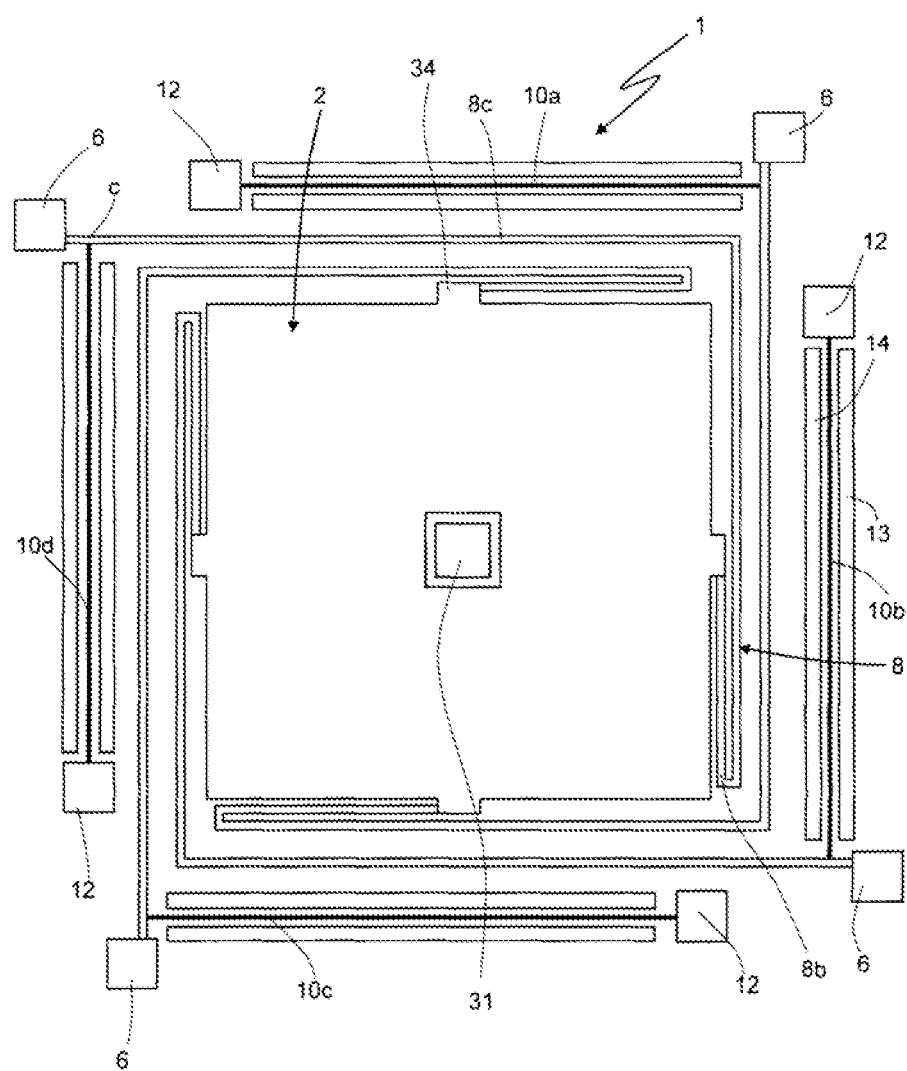
FIGS. 7a and 7b show simplified top plan views of further variants of the microelectromechanical detection structure.
Figure 7B:
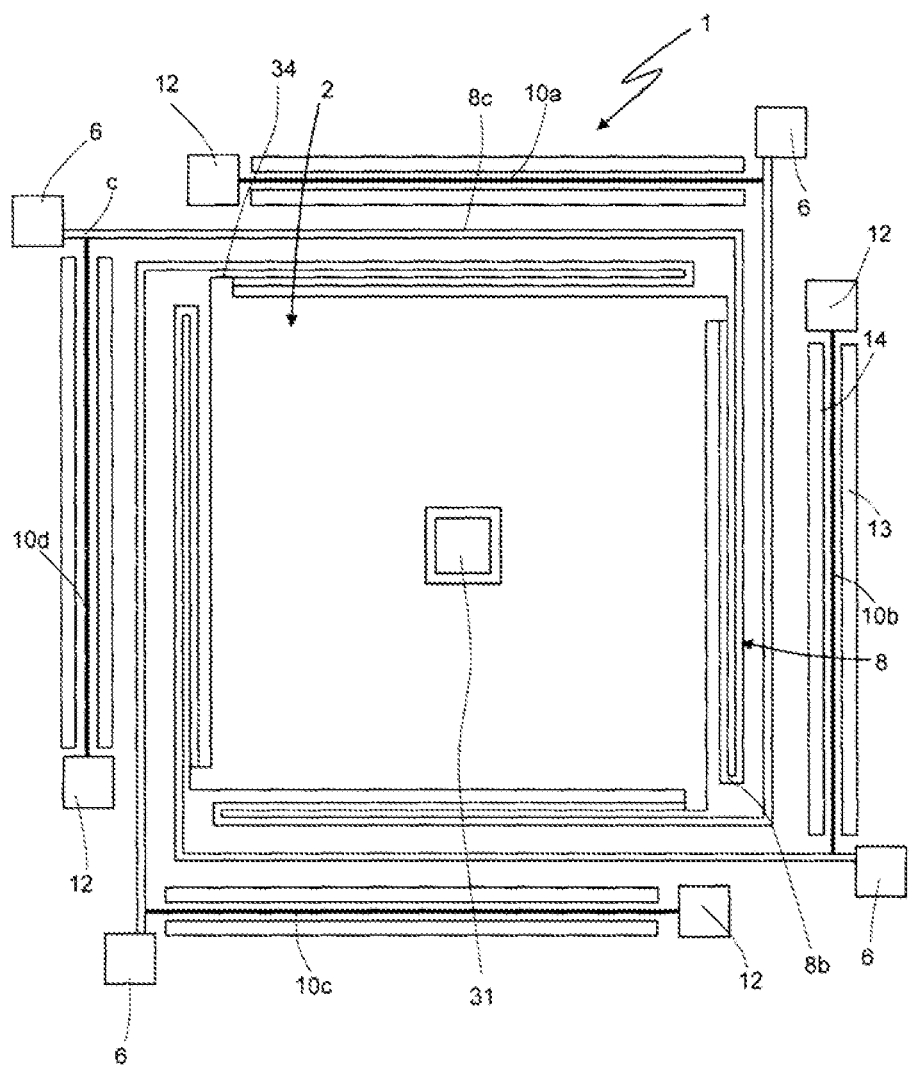

FIGS. 7a and 7b show further variants of the microelectromechanical detection structure 1, in which the resonant elements 10a-10d and the corresponding second anchorages 12, as also the first anchorages 6 of the inertial mass 2, are arranged externally with respect to the inertial mass 2, in the plane xy. In this case, a stopper element 31 is set centrally with respect to the inertial mass 2, within an opening made through said inertial mass 2, which otherwise is constituted by a single body of a generically square shape in plan view.

In said variants, the elastic elements 8, and in particular the corresponding second portions 8b, of a folded type, are connected to projections 34 of the inertial mass 2 (which project with respect to the substantially square overall dimensions of said inertial mass 2 in the plane xy). It should be noted that, in a way not illustrated, the elastic elements 8 can also in this case comprise first rectilinear portions 8a, set between respective second portions 8b and projections 34.

In particular, in the variant of FIG. 7a, the projections 34, which are four in number, are arranged centrally with respect to respective peripheral sides of the inertial mass 2, whilst in the variant of FIG. 7b the projections 34 are arranged at the corners of the inertial mass 2.

The third portions 8c, of a rectilinear type, of said elastic elements 8 extend once again in a direction transverse to the respective resonant elements 10a-10d, connecting up to the respective first anchorages 6 of the inertial mass 2 (which are here again four in number). The resonant elements 10a-10d are connected to the elastic elements 8, at a point of connection c of the corresponding third portion 8c, close to the corresponding first anchorage 6. The second portions 8b of elastic elements 8 associated to resonant elements 10a-10d that do not belong to said pair (i.e., are not directed along said axis) are moreover arranged parallel and adjacent to peripheral opposite sides, facing one another, of the inertial mass 2.

Operation of the microelectromechanical detection structure 1 in the embodiments of FIGS. 7a, 7b, and in particular the deformations of the constitutive elements following upon external accelerations, does not differ from what has been described previously.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical detection structure for a MEMS resonant biaxial accelerometer, comprising:
   a substrate;
   an inertial mass having a plane of main extension;
   first and second elastic elements configured to anchor the inertial mass to the substrate, suspend the inertial mass above said substrate, and enable inertial movements of detection of said inertial mass along associated first and second detection axes, respectively, in response to respective linear external accelerations;
   a first resonant element having a longitudinal extension along said first detection axis and mechanically coupled to said inertial mass through said first elastic element, the first resonant element being configured to undergo an associated first axial stress when said inertial mass moves along said first detection axis; and
   a second resonant element having a longitudinal extension along said second detection axis and mechanically coupled to said inertial mass through said second elastic element, the second resonant element being configured to undergo an associated second axial stress when said inertial mass moves along said second detection axis.

2. The structure according to claim 1, wherein:
   said first resonant element is mechanically coupled to said inertial mass through the first elastic element in such a way as to not undergo the first axial stress when said inertial mass moves along said second detection axis; and
   the second resonant element is mechanically coupled to said inertial mass through the second elastic element in such a way as to not undergo the second axial stress when said inertial mass moves along said first detection axis.

3. The structure according to claim 1, further comprising:
   a plurality of first anchorages coupled to the inertial mass by said first and second elastic elements, respectively, each elastic element having a connection point to the first and second resonant elements in the proximity of the respective first anchorage, and each of said first and second resonant elements having a first end and a second end; and
   a plurality of second anchorages, respectively anchoring the first ends of the first and second resonant elements to said substrate, the second ends of the first and second resonant elements being mechanically coupled to the connection points of said elastic elements, respectively.

4. The structure according to claim 3, wherein said connection point is positioned along said respective one of said elastic elements, at a distance from the corresponding first anchorage in the range of 1/100 and 2/100 of a length of said respective one of said elastic elements in a direction transverse to said longitudinal extension of the associated first or second resonant element.

5. The structure according to claim 1, wherein each of said first and second elastic elements includes:
   a rectilinear portion, extending in a direction transverse to said longitudinal extension of the associated resonant element, said rectilinear portion being coupled to the associated resonant element and being configured to bend to enable the associated axial stresses when said inertial mass moves along said first or second detection axis; and a folded portion mechanically coupled and extending in a direction transverse to, said rectilinear portion, said folded portion being configured to undergo deformation when said inertial mass moves in a direction transverse to the longitudinal extension of the associated resonant element.

6. The structure according to claim 5, wherein said folded portion includes a plurality of rectilinear segments, parallel to one another and joined at respective ends; and wherein said rectilinear portion includes a first segment having a first end coupled to said inertial mass and a second end coupled to an initial rectilinear segment of said folded portion, and a second segment having a first end coupled to the corresponding first anchorage and a second end coupled to a terminal rectilinear segment of said folded portion.

7. The structure according to claim 1, further comprising:
third and fourth elastic elements;
a third resonant element having a longitudinal extension in a direction parallel to said first resonant element, and mechanically coupled to said inertial mass through said third elastic element in such a way as to undergo a third axial stress of the same intensity and opposite sign with respect to the first axial stress when said inertial mass moves along said first detection axis; and
a fourth resonant element having a longitudinal extension in a direction parallel to said second resonant element, and mechanically coupled to said inertial mass through said fourth elastic element in such a way as to undergo a fourth axial stress of the same intensity and opposite sign with respect to the second axial stress when said inertial mass moves along said second detection axis.

8. The structure according to claim 1, further comprising first and second anchorages external to said inertial mass with respect to said plane, wherein:

the inertial mass includes said first and second resonant elements arranged externally to said inertial mass with respect to said plane, a central portion and side portions that are coupled by said central portion and define between them openings, which open towards the outside of said inertial mass; and wherein said first and second elastic elements extend starting from said central portion, in part through said openings so as to reach the first and second anchorages, respectively.

9. The structure according to claim 1, further comprising first and second anchorages arranged externally to said inertial mass with respect to said plane, wherein:

said first and second resonant elements are arranged externally to said inertial mass with respect to said plane;

said inertial mass has first and second projections that extend in said plane starting from first and second peripheral sides, respectively, of said inertial mass;

said first and second elastic elements extend respectively from the first and second projections to the first and second anchorages, respectively said first elastic element includes:
a first rectilinear portion which extends in a direction transverse to said longitudinal extension of the first resonant element; and
a first folded portion which is mechanically coupled, and extends in a direction transverse to, said first rectilinear portion, said first folded portion extending adjacent to the first peripheral side of said inertial mass, and said first resonant element extending adjacent to a third peripheral side of said inertial mass, parallel to said first peripheral side.

10. The structure according to claim 1, further comprising an anchorage on the substrate, wherein:
said inertial mass includes a frame having an internal opening;
said first and second elastic elements extend entirely in said internal opening from said frame to the anchorage;
said anchorage is arranged centrally with respect to said internal opening; and
said first and second resonant elements are set internally to said inertial mass with respect to said plane, in said internal opening.

11. The structure according to claim 1, wherein said elastic elements are configured to enable a rotation of the inertial mass about an axis orthogonal to said plane, in response to an external angular acceleration; and said first and second resonant elements are configured to undergo the first and second axial stresses, respectively, in response to the rotation.

12. The structure according to claim 1, further comprising:
first electrodes electrically coupled to said first and second resonant elements and configured to resonate the first and second resonance elements, respectively; and
second electrodes electrically coupled to said first and second resonant elements and configure to enable detection of respective variations of resonance frequencies of the first and second resonance elements, as a function of said first and second axial stresses, respectively.

13. A resonant biaxial accelerometer, comprising:
a microelectromechanical detection structure that includes:
a substrate;
an inertial mass having a plane of main extension;
first and second elastic elements configured to anchor the inertial mass to the substrate, suspend the inertial mass above said substrate, and enable inertial movements of detection of said inertial mass along associated first and second detection axes, respectively, in response to respective linear external accelerations;
a first resonant element having a longitudinal extension along said first detection axis and mechanically coupled to said inertial mass through said first elastic element, the first resonant element being configured to undergo an associated first axial stress when said inertial mass moves along said first detection axis; and
a second resonant element having a longitudinal extension along said second detection axis and mechanically coupled to said inertial mass through said second elastic element, the second resonant element being configured to undergo an associated second axial stress when said inertial mass moves along said second detection axis;
wherein the detection structure is configured to detect a first and a second linear external acceleration component, directed, respectively, along said first and second detection axes.

14. The accelerometer according to claim 13, further comprising a reading circuit, electrically coupled to said microelectromechanical detection structure.

15. The accelerometer according to claim 13, wherein said first and second resonant elements are mechanically coupled to said inertial mass through the first and second elastic elements, respectively, in such a way as to not undergo the associated axial stresses when said inertial mass moves along said second detection axis and said first detection axis, respectively.

16. The accelerometer according to claim 13, further comprising:
- a plurality of first anchorages coupled to the inertial mass by said first and second elastic elements, respectively, each elastic element having a connection point to the first and second resonant elements in the proximity of the respective first anchorage, and each of said first and second resonant elements having a first end and a second end; and
- a plurality of second anchorages, respectively anchoring the first ends of the first and second resonant elements to said substrate, the second ends of the first and second resonant elements being mechanically coupled to the connection points of said elastic elements, respectively.

17. An electronic apparatus, comprising:
a resonant biaxial accelerometer, the accelerometer including:
- a microelectromechanical detection structure that includes:
  - a substrate;
  - an inertial mass having a plane of main extension;
  - first and second elastic elements configured to anchor the inertial mass to the substrate, suspend the inertial mass above said substrate, and enable inertial movements of detection of said inertial mass along associated first and second detection axes, respectively, in response to respective linear external accelerations;
  - a first resonant element having a longitudinal extension along said first detection axis and mechanically coupled to said inertial mass through said first elastic element, the first resonant element being configured to undergo an associated first axial stress when said inertial mass moves along said first detection axis; and
  - a second resonant element having a longitudinal extension along said second detection axis and mechanically coupled to said inertial mass through said second elastic element, the second resonant element being configured to undergo an associated second axial stress when said inertial mass moves along said second detection axis;
  - wherein the detection structure is configured to detect a first and a second linear external acceleration component, directed, respectively, along said first and second detection axes;
- a reading circuit electrically coupled to the microelectromechanical detection structure; and
- a control unit, electrically coupled to said reading circuit.

18. The apparatus according to claim 17, wherein said first and second resonant elements are mechanically coupled to said inertial mass through the first and second elastic elements, respectively, in such a way as to not undergo the associated axial stresses when said inertial mass moves along said second detection axis and said first detection axis, respectively.

19. The apparatus according to claim 17, further comprising:
- a plurality of first anchorages coupled to the inertial mass by said first and second elastic elements, respectively, each elastic element having a connection point to the first and second resonant elements in the proximity of the respective first anchorage, and each of said first and second resonant elements having a first end and a second end; and
- a plurality of second anchorages, respectively anchoring the first ends of the first and second resonant elements to said substrate, the second ends of the first and second resonant elements being mechanically coupled to the connection points of said elastic elements, respectively.

* * * * *